S. PAULSON.
SAW SETTING, FILING, AND SWAGING MACHINE.
APPLICATION FILED JUNE 17, 1913.

1,132,379.

Patented Mar. 16, 1915.
5 SHEETS—SHEET 1.

WITNESSES
G. Robert Thomas
C. B. Bradway.

INVENTOR
SWEN PAULSON
BY Munn & Co
ATTORNEYS

S. PAULSON.
SAW SETTING, FILING, AND SWAGING MACHINE.
APPLICATION FILED JUNE 17, 1913.

1,132,379.

Patented Mar. 16, 1915.
5 SHEETS—SHEET 2.

WITNESSES

INVENTOR
SWEN PAULSON
BY
ATTORNEYS

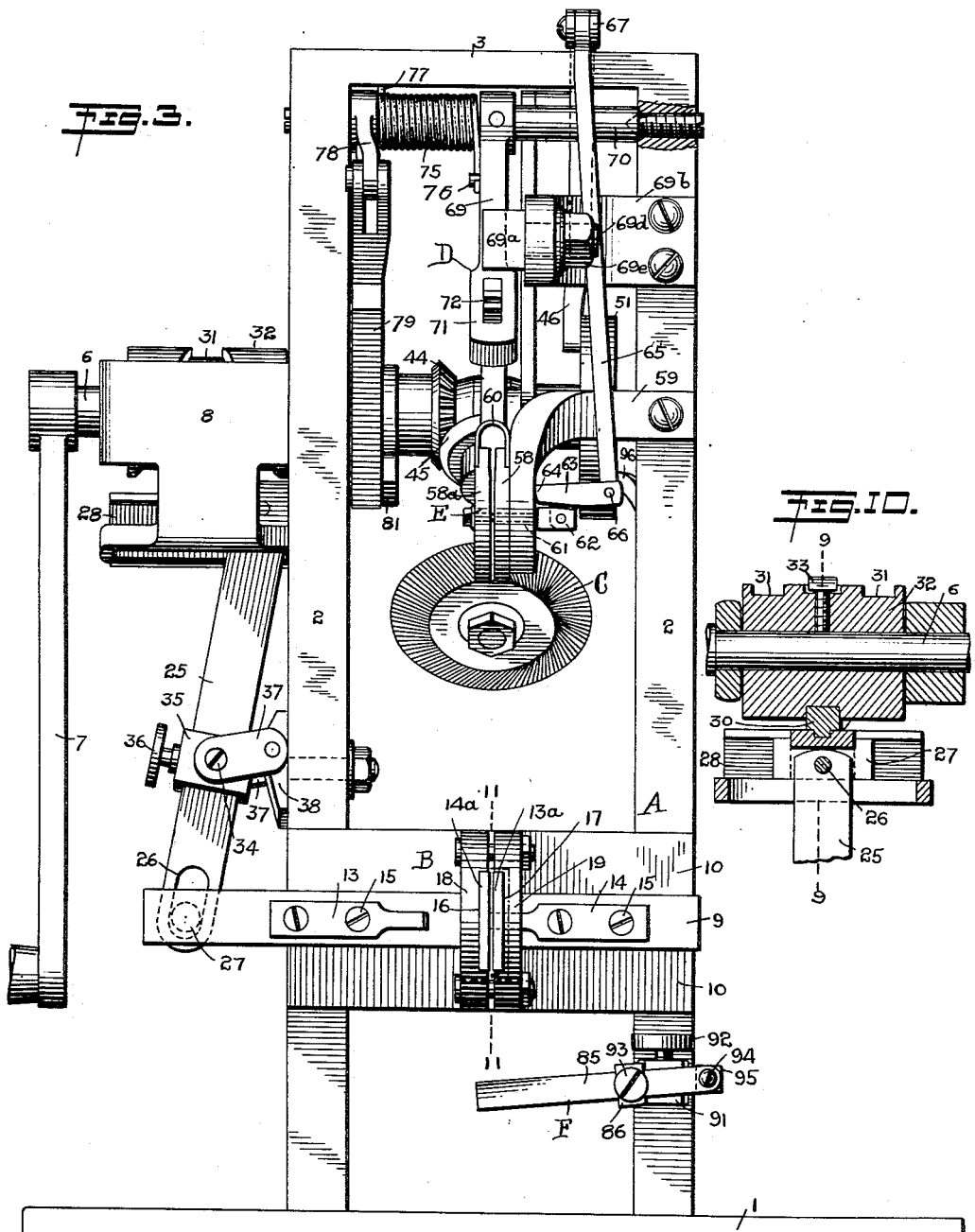

S. PAULSON.
SAW SETTING, FILING, AND SWAGING MACHINE.
APPLICATION FILED JUNE 17, 1913.
1,132,379.
Patented Mar. 16, 1915.
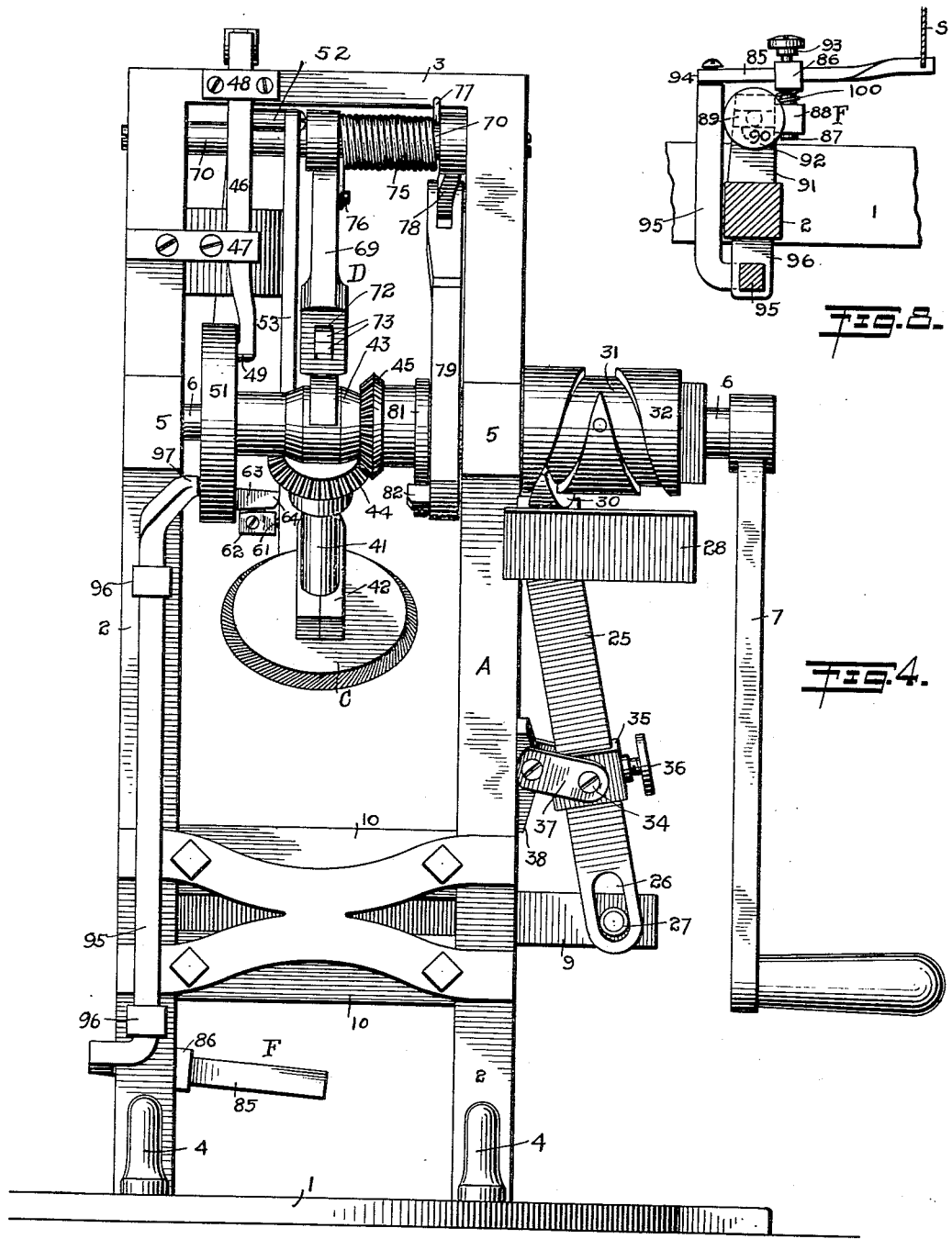
WITNESSES
G. Robert Thomas
le Broadway.
INVENTOR
SWEN PAULSON
BY Munn & Co
ATTORNEYS

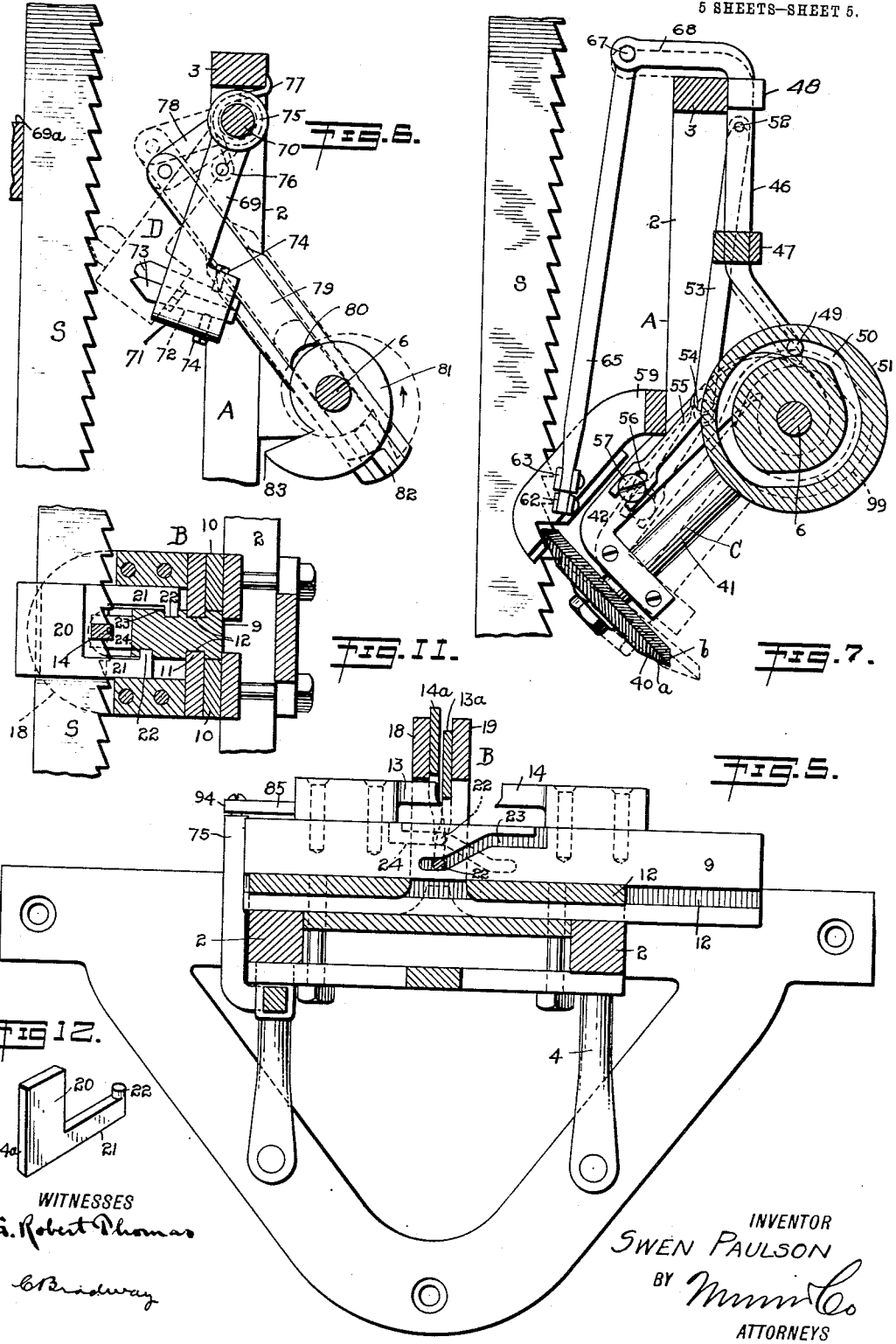

UNITED STATES PATENT OFFICE.

SWEN PAULSON, OF HEBER, UTAH.

SAW SETTING, FILING, AND SWAGING MACHINE.

1,132,379.  Specification of Letters Patent.  Patented Mar. 16, 1915.

Application filed June 17, 1913.  Serial No. 774,119.

*To all whom it may concern:*

Be it known that I, SWEN PAULSON, a subject of the King of Sweden, and a resident of Heber, in the county of Wasatch and State of Utah, have invented a new and Improved Saw Setting, Filing, and Swaging Machine, of which the following is a full, clear, and exact description.

This invention relates to a machine for setting, filing and swaging saw teeth and relates more particularly to a machine for operating on band saws without necessitating the removal of the saw from the sawing machine, but it is to be understood that the invention is not necessarily limited to operations on saws of the type mentioned.

The invention has for its general objects to improve and simplify the construction and operation of machines of the character referred to so as to be reliable and efficient in use, easily and quickly adjusted and operated and capable of being mounted on the table of the saw machine in coöperative relation with the band saw while the latter is in position.

Another object of the invention is the provision of saw setting, filing and swaging devices combined in a novel relation and connected with a single operating shaft for simultaneous operation, so that at one time one tooth will be set, another filed and a third swaged.

An additional object of the invention is the provision of a feed device operatively connected with the drive shaft of the setting, filing and swaging devices so that during one-half turn more or less of the driving shaft the said setting, filing and swaging devices will be actuated, while during the second half of the revolution of the driving shaft the feeding device will move the saw one tooth and then clamp the saw in position preparatory to the throwing into operation of the setting, filing and swaging devices.

With these objects in view, and others as will appear as the description proceeds, the invention comprises various novel features of construction and arrangement of parts which will be more fully described hereinafter and set forth with particularity in the claims appended hereto.

Figure 1:
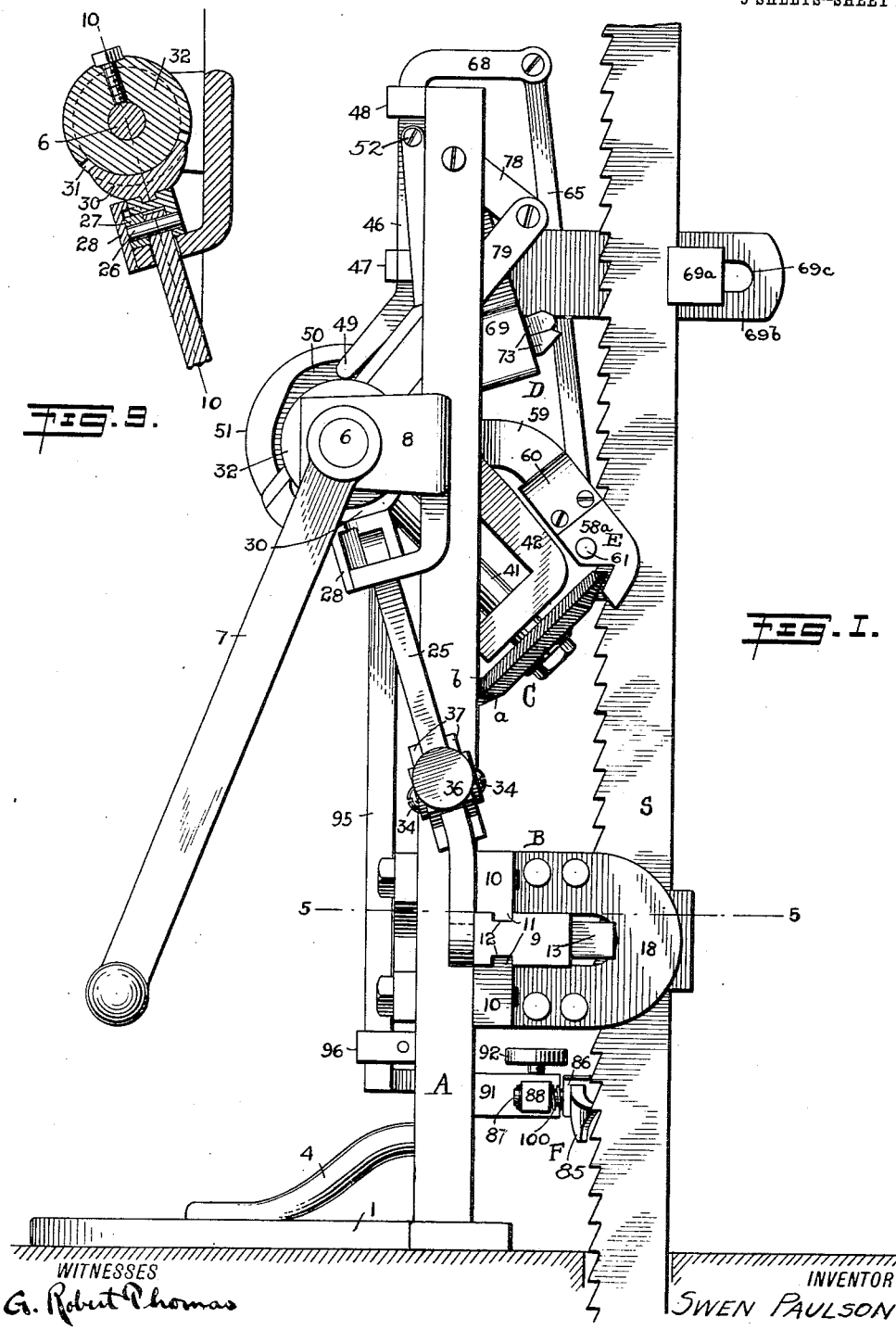
Figure 2:
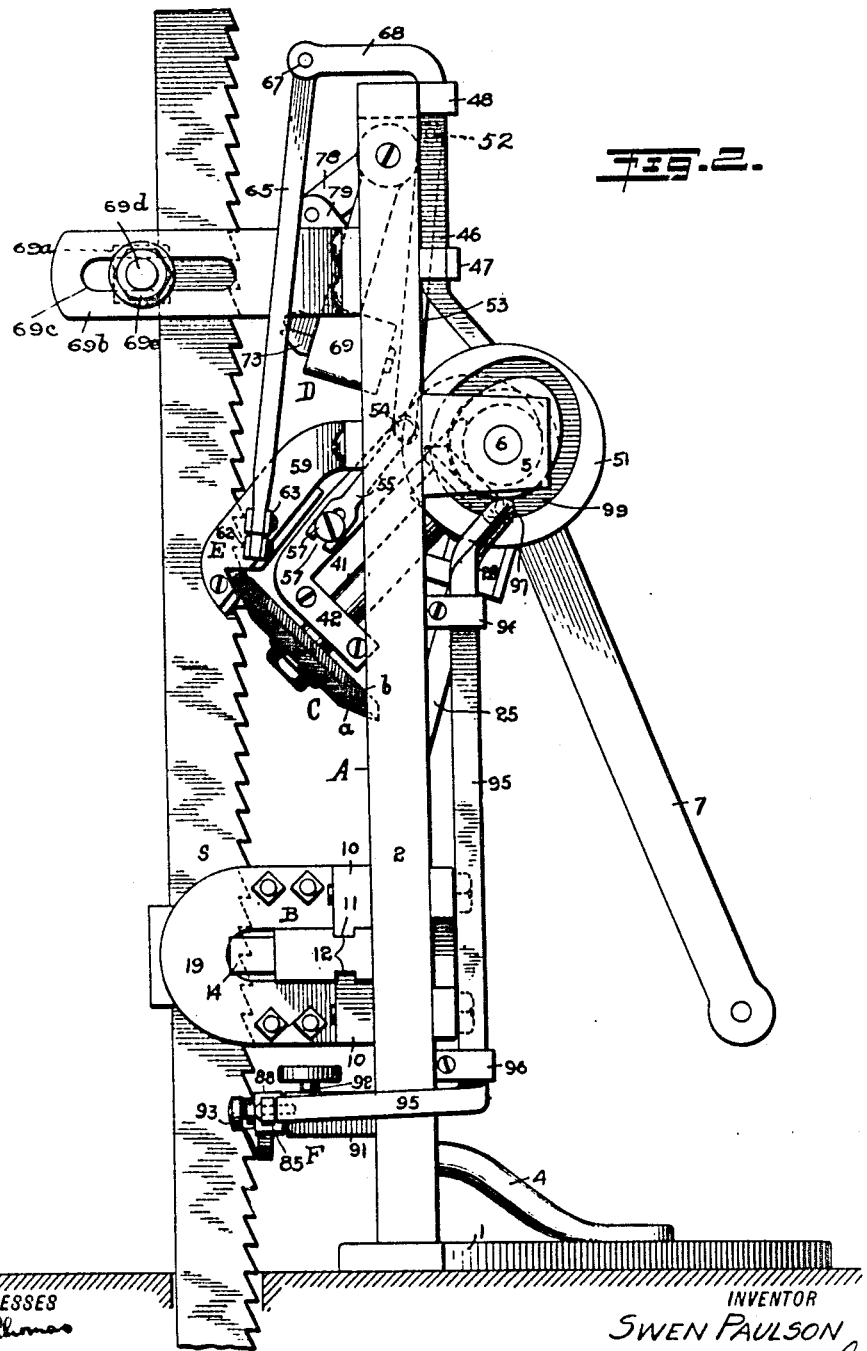

In the accompanying drawings, which illustrate one embodiment of the invention, and wherein similar reference characters are employed to designate corresponding parts throughout the several views, Figure 1 is an elevation of the machine taken from the crank side thereof; Fig. 2 is an elevation of the opposite side of the machine; Fig. 3 is a front view of the machine; Fig. 4 is a rear view; Fig. 5 is a horizontal section on the line 5—5 of Fig. 1; Fig. 6 is a detail view of the swaging device; Fig. 7 is a detail sectional view of the filing device; Fig. 8 is a sectional view showing in plan the saw feeding means; Fig. 9 is a detail sectional view on the line 9—9 of Fig. 10 through the cam arrangement for operating the setting elements; Fig. 10 is a sectional view on the line 10—10 of Fig. 9; Fig. 11 is a detail sectional view on the line 11—11 of Fig. 3, showing the relation of the anvils to the setting elements; and Fig. 12 is a perspective view of one of the elements coöperating with a tooth setting element.

Referring to the drawings, A designates the frame of the machine on which is mounted a saw setting device B, a saw filing device C, a saw swaging device D, a saw clamp-device E, and a saw feeding device F, the setting device being located adjacent the bottom of the frame A with the feeding device F thereunder and the filing device C being located above the setting device and adjacent the clamping means E, but under the swaging device D, so that the saw in feeding upwardly will have a given tooth first set, then filed, and finally swaged.

The frame A comprises a base 1 from which rise standards 2 spaced apart which have their upper ends united by a crosspiece 3, and between the base 1 and standards are braces 4 for fastening and stiffening the structure A. On the rear side of the standards at a point about two-thirds the height of the frame A are bearings 5 in which is mounted a rotatable drive shaft 6 that is equipped with a suitable power applying means such as a crank 7 when the machine is to be operated by hand, and from this shaft all the various devices of the machine are operated. One of the standards 2 is provided with a bracket 8 which supports the end of the shaft 6 that carries the operating crank 7.

The setting device comprises a slide 9 which is movable horizontally between guides 10 fastened to the standards 2, these guides having longitudinally-extending tongues 11 arranged in opposed relation and entering grooves 12 in the top and bottom surfaces of the slide 9. On the front surface of the slide 9 are opposed and spaced apart tooth setting elements 13 and 14 removably held in place by screws 15, and coöperating with the elements 13 and 14 are anvils 13$^a$ and 14$^a$, respectively. The anvils 13$^a$ and 14$^a$ are mounted to reciprocate horizontally in a plane at right-angles to the reciprocation of the setting elements 13 and 14, and the anvils are slidable in grooves or guideways 16 and 17 formed in bridge members 18 and 19 that extend forwardly from the upper and lower guides 10, 10, for the slide 9. In each anvil is an L-shaped plate shown clearly in Figs. 11 and 12, that comprises a tooth-engaging portion 20, a shank or arm 21 and a lug 22 on the end of the shank. The lug 22 of the anvil 13$^a$ engages in a cam groove 23 in the top surface of the slide 9, and the lug 22 of the anvil 14$^a$ engages in an oppositely-disposed cam groove 24 in the bottom surface of the slide 9, the relation of the two grooves being shown clearly in Fig. 5, wherein the groove 23 is shown in full lines and the groove 24 in dotted lines. By this relation of the parts the longitudinal movement of the slide 9 to the left, Fig. 5, will cause the anvil 13$^a$ to be retracted and the anvil 14$^a$ to be advanced to a position in line with the approaching setting element 14, so as to engage a saw tooth and set the latter, it being understood that the saw blade will be disposed between the two anvils 13$^a$ and 14$^a$ so that an anvil will always be disposed on the side of the saw blade opposite from the said element. In Fig. 5 the anvil 13$^a$ is shown in advanced position and the setting element 13 in position for setting a tooth, this relation of the parts having been brought about by the movement of the slide 9 to the right.

The setting device is operated back and forth from the shaft 6 by a motion transmitting means comprising essentially a lever 25 which is disposed at one side of the frame A and has at its lower end a slot 26 in which engages a pin 27 on the slide 9, and the upper end of the lever 25 is pivotally connected at 26$^a$, Figs. 9 and 10, with a slide or carrier 27$^a$ movable in a horizontal guide 28 carried by the bracket 8, there being on this slide 27$^a$ a swiveled shoe 30 that is adapted to run in an endless compound or crossing groove 31 in a cam 32 that is fastened by a set-screw or equivalent means 33 to the shaft 6, whereby the rotation of the cam 32 will cause the shoe 30 to move back and forth to the right and left so as to oscillate the lever 25 on a fulcrum or center 34, Fig. 3. The lever 25 passes through a block 35 which is provided with a set-screw 36 adapted to bind on the lever, and by loosening this set-screw the block 35 which carries the fulcrum 34 can be shifted longitudinally of the lever to change the effective length of the two arms thereof and consequently vary the travel of the slide 9 of the tooth setting device. The fulcrum block 35 is connected by links 37 with a block 38 bolted to the adjacent standard 2 of the frame A, the links 37 serving to connect the fulcrum block to the frame and also provide for the changing of the fulcrum axis of the lever.

The saw filing device C consists of a rotary file 40 fastened to an arbor 41 that is rotatable in a hanger 42 which has a hub or head 43 through which the drive shaft 6 passes, and on the arbor 41 is a bevel gear 44 which meshes with a bevel gear 45 on the shaft 6, whereby the shaft 6 imparts rotation to the arbor 41 and rotary file 40. This file has two surfaces $a$ and $b$ so disposed with relation to each other that the surface $a$ files the back of one tooth while the surface $b$ files the front of an adjacent tooth, as clearly shown in Fig. 7. In order that the saw S can be advanced step by step in order that the teeth can be successively operated on it is necessary to move the file laterally out of contact with the saw to permit the latter to be advanced. In other words, the file 40 and arbor 41 must be moved to the dotted line position, Fig. 7, to allow the saw to pass the file. This movement is effected by an elevator 46 slidable in guides 47 and 48, Figs. 2, 4 and 7, the lower end of the elevator being formed into a lug 49, Fig. 7, that moves in a groove 50 in the face of the rotary cam 51 on the drive shaft 6. Pivotally connected at 52 to the upper portion of the elevator 46 is a link 53 which has its lower end hingedly connected at 54 with a member 55 fastened to the hanger 42, so that as the elevator 46 is raised the link 53 will cause the hanger 42 to throw the file or cutter 40 from the dotted to the full line position, Fig. 7, when the portion of the cam groove 50 of greater radius engages the lug 49 of the elevator, but when the lug 49 enters the portion of the cam groove of lesser radius the parts will be moved to the dotted line position, Fig. 7. The member 55 is provided with a slot 56 through which extends a screw or equivalent fastening 57 which secures the member 55 to the hanger 42, the slot and screw device serving as an adjustable connection between the elevator and hanger whereby the range of movement of the latter can be adjusted.

To withstand the thrust of the rotary file which is fed toward the saw by reason of the particular shape of the groove 50 in the cam 51, the saw clamping device E is employed, such device comprising, as shown in Fig. 3, a fixed jaw 58 mounted on a bracket 59 that is secured to one of the standards 2 of the frame A, and coöperating with the jaw 58 is a movable jaw 58$^a$ connected with the jaw 58 by a U-shaped spring 60. The movable jaw is connected with a pin 61 which passes freely through the fixed jaw 58 and bracket 59 and has a head 62 on which is fulcrumed a lever 63, the end 64 of the lever having a wiping engagement with the bracket 59 so that as the lever is tilted in one direction the movable jaw 58ª will be pulled toward the fixed jaw 58 against the tension of the spring 60, and when the lever tilts in the opposite direction the jaw 58ª will move away from the jaw 58 by reason of the tension of the spring 60. The jaw-operating lever 63 is actuated by the elevator 46 through a rod 65 which has its lower end connected at 66 with the lever 63 and its upper end connected at 67 with the forwardly-projecting arm 68 on the upper end of the elevator 46. The jaw opening movement of the lever 63 occurs when the file moves away from the saw teeth, so that the saw can be advanced another tooth while the file is disengaged from the saw.

The swaging device comprises a hammer 69 fastened to a rotary shaft 70 mounted in the upper ends of the standards 2, and the outer end or head 71 of the hammer 69 is provided with an opening 72 in which are set the swages 73 held in place by set screws 74, as shown in Fig. 6. On the hammer shaft 70 is a coiled spring 75 that has one end anchored at 76 on the hammer 69, while the other end 77 is engaged with the top piece 3 of the frame A. The hammer shaft 70 is provided with an arm 78 which is connected with a reciprocating actuator 79 which has a slot 80 through which the main shaft 6 passes, and on this shaft 6 is a snail cam 81 with which engages a lug 82, Fig. 6, of the actuating element. As the cam turns in an anti-clockwise direction, Fig. 6, the element 79 is moved in a direction to shift the hammer or swage element from the dotted line to the full line position, and as soon as the lug 82 slips off the tip 83 of the cam the spring 75 will cause the swaging element to strike a blow on the saw tooth and swage the latter, as shown by the dotted lines in Fig. 6. The blow of the swaging hammer on the saw is withstood by an abutment or anvil 69ª which is mounted on a bracket 69ᵇ, as clearly shown in Figs. 1, 2 and 3, said bracket having a slot 69ᶜ for receiving the threaded stud 69ᵈ of the block, there being on the stud a nut 69ᵉ whereby the anvil can be clamped firmly in any desired position on the bracket 69ᵇ, the slot 69ᶜ providing for the adjustment of the anvil toward or from the hammer, so that the machine can operate on band saws of different widths.

The saw feeding means F comprises a lever or oscillatory element 85 which is mounted in a fulcrum block 86, said block having a stem or pivot stud 87, as shown in Fig. 8, which is loose in the bearing 88 of a member 89 that is adjustable in an opening 90 in an arm 91 on one of the standards 2. A set-screw 92 in the arm 91 binds on the member 89 to hold the latter in any desired position, and the set screw 93 is mounted in the fulcrum block 86 to engage the lever 85. By loosening the set screws 92 and 93 the member 89 can be shifted axially and the block 86 shifted longitudinally of the lever 85, so as to vary the fulcrum center of the lever to obtain an accurate feed of the saw. It is obvious that the swing of the feeding lever can be adjusted to exactly equal the dimension of a tooth along the root line, so that with each movement of the feeding element 85 the saw will be advanced one tooth. The saw feeding lever 85 has its outer end 94 connected with the lower end of an actuating element 95 which is slidable in bearings 96 on one of the standards 2 of the frame. The upper end of the actuator is formed into a lug 97 which engages in a cam groove 99 in the side of the cam disk 51 opposite from that having the cam groove 50 for the elevator 46. The cam grooves 50 and 99 are so related that the jaws 58 and 58ª of the clamping device will release the saw at the same time the feeding element 85 engages the saw to move the same one tooth forwardly or upwardly. A spring 100 is arranged on the stem 87 to yieldingly hold the member 85 against the saw tooth, and during the downward movement of the member 85 the spring 100 will allow such member to slip laterally in passing to the next tooth of the saw.

As the various devices for setting, filing and swaging the teeth of the saw are disposed in a common line it is clear that the respective devices can operate on three different teeth at the same time, so that a saw can be quickly and accurately set, filed and swaged by a single machine.

It is to be understood that the present machine is set up on the table of a saw machine in such position that the band saw will be disposed in coöperative relation with the various teeth treating instrumentalities of the machine.

From the foregoing description taken in connection with the accompanying drawings, the advantages of the method of operation and of the apparatus shown will be readily understood by those skilled in the art to which the invention appertains, and while I have described the apparatus which I now consider to be the best embodiment thereof, I desire to have it understood that the apparatus shown is merely illustrative, and that such changes may be made when desired as are within the scope of the appended claims.

Having thus described my invention, I claim as new and desire to secure by Letters Patent:

1. A machine of the class described comprising a rotary saw file shaped to work on two teeth at once, saw-clamping jaws shaped to grip two teeth on which the file operates, means for mounting the saw and jaws for relative movement, means for relatively moving the file and jaws for engaging the file with the saw clamped in the jaws, means for opening the jaws after the file has acted on the saw, and means for feeding the saw while the file is disengaged therefrom.

2. A machine of the class described comprising a rotary file, a driving shaft therefor, a hanger swinging on the shaft and supporting the file, saw holding jaws, an element operated by the shaft for opening the jaws, and a connection between the element and hanger to move the file away from the saw as the jaws open and toward the saw as the jaws close.

3. A machine of the class described comprising a rotary file, a driving shaft therefor, a hanger swinging on the shaft and supporting the file, saw holding jaws, a cam on the shaft, an element actuated by the cam, and separate connections between the element and hanger and the hanger and jaws for opening and closing the latter as the file moves away and toward the saw.

4. In a machine of the class described, the combination of a continuously rotating file for filing the front and back faces of two adjacent teeth at a time; saw clamping jaws mounted in fixed position and relatively movable and shaped to grip the two teeth on which the file operates, means for moving the file toward and from the jaws while the latter are closed, and means for opening the jaws while the file is moved away from the latter for permitting the saw to be fed with respect to the file.

In testimony whereof I have signed my name to this specification in the presence of two subscribing witnesses.

SWEN PAULSON.

Witnesses:
CHASE HATCH,
PETER JOHNSON.